(12) United States Patent
Schweitzer

(10) Patent No.: US 7,429,742 B1
(45) Date of Patent: Sep. 30, 2008

(54) OPTICAL UV LAMP-ON INDICATOR

(75) Inventor: Todd Schweitzer, New Richmond, OH (US)

(73) Assignee: UV Doctor Management LLC, Las Vegas, NV (US)

( * ) Notice: Subject to any disclaimer, the term of this patent is extended or adjusted under 35 U.S.C. 154(b) by 83 days.

(21) Appl. No.: 11/644,800

(22) Filed: Dec. 21, 2006

(51) Int. Cl.
  *G01N 21/01* (2006.01)
  *C02F 1/32* (2006.01)
(52) U.S. Cl. .................................. 250/436; 210/748
(58) Field of Classification Search ................ 362/551, 362/559; 422/24; 250/436; 210/748
See application file for complete search history.

(56) References Cited

U.S. PATENT DOCUMENTS

| | | | |
|---|---|---|---|
| 6,447,720 B1 * | 9/2002 | Horton et al. ................. | 422/24 |
| 6,461,520 B1 * | 10/2002 | Engelhard et al. ............ | 210/748 |
| 6,570,173 B1 * | 5/2003 | Kunkel et al. ............ | 250/504 R |
| 7,175,806 B2 * | 2/2007 | Deal et al. ..................... | 422/24 |
| 7,223,002 B2 * | 5/2007 | Miller et al. ................. | 362/551 |
| 2005/0186124 A1 * | 8/2005 | Fink et al. .................... | 422/121 |

\* cited by examiner

*Primary Examiner*—Ali Alavi
(74) *Attorney, Agent, or Firm*—Cislo & Thomas, LLP

(57) ABSTRACT

An observable optical lamp status display system is provided for an ultraviolet irradiation lamp concealed from view. An external lamp status display panel that is within the field of view of an observer registers the operating status of each ultraviolet light irradiation lamp in an array of irradiation lamps. A separate fiberoptic lamp status display filament extends between each ultraviolet radiation lamps and the display panel. The lamp status display filament has a first end terminated in optical communication with the ultraviolet lamp and an opposite end that terminates in the lamp status display panel. An observer can determine whether or not a lamp is operating simply by observing whether or not light emanates from the end of the lamp status display filament in the display panel for each lamp operated.

10 Claims, 5 Drawing Sheets

OPTICAL UV LAMP-ON INDICATOR

BACKGROUND OF THE INVENTION

1. Field of the Invention

The present invention relates to a system for displaying the status of operation of shielded ultraviolet irradiation lamps using fiberoptic filaments.

2. Description of the Prior Art

Ultraviolet radiation lamps are widely utilized in many different industries for irradiating different substances with ultraviolet radiation. UV lamps are utilized to kill bacteria in food and water, and also on the packaging for food and beverage products. Ultraviolet irradiation lamps are utilized to treat food packaging products such as diary product cartons, lids, sealing films, plastic wrap, labels, reusable product containers and other articles used in the packaging of products, as well as in the sanitization of food and beverages items themselves.

In conventional ultraviolet bacteria irradiation treatment a plurality of ultraviolet lamps are typically positioned within an enclosure through which the materials to be sanitized by UV irradiation are passed. As the material to be treated is advanced past the stationary ultraviolet lamps, either by fluid flow or by some apparatus for conveyance, the material to be treated passes in close proximity to the lamps. Ultraviolet radiation emitted by the lamps kills bacteria, microbes, and other harmful biological contaminants.

Because ultraviolet radiation is harmful to the human operators of the sanitizing equipment, it is important for the enclosures containing the ultraviolet radiation lamps to be shielded to prevent harmful UV radiation from being directed at the equipment operators and other individuals in the vicinity. UV radiation can be particularly damaging to a person's eyesight.

The most inexpensive type of shielding is some type of opaque substance, such as metal or thick plastic which resists penetration to both ultraviolet radiation and also visible light. As a consequence, the ultraviolet lamps that irradiate the materials to be treated are normally concealed from view and are not directly observable by the equipment operators. Shielding avoids exposure to harmful radiation, especially damage to the eyes of the equipment operators.

However, since it is typically not possible to observe the ultraviolet lamps in operation, a lamp can cease to emit ultraviolet radiation without being noticed by the equipment operators. If a nonfunctional ultraviolet lamp is left in position, material to be treated flows past it, but is not subjected to sufficient ultraviolet radiation. Consequently, while the equipment operators may think that the system is effectively performing its irradiation function, in fact, some of the material passing through the system may be untreated, or treated inadequately.

To remedy this situation conventional electronic systems have been devised to display the operational status of ultraviolet radiation tubes to the equipment operators at a status display panel. In such systems electronic circuits are embodied in the ultraviolet lamp couplings through which power is provided to generate ultraviolet radiation. The electrical power utilized to produce the required ultraviolet radiation also serves to provide an operational status indication for each ultraviolet lamp to the equipment operators.

While such electronic status indicators do perform the desired function of displaying to the equipment operators the operational status of the different ultraviolet lamps, these circuits are unnecessarily complex and therefore expensive. Furthermore, these sensing circuits can malfunction and provide either false positive or false negative indications which disrupt the efficient throughput of materials to be treated.

SUMMARY OF THE INVENTION

The present invention provides a display system for monitoring the status of ultraviolet lamps that does not require any electrical sensing circuitry whatsoever. To the contrary, the lamp display system of the present invention operates entirely on an optical basis. That is, a small portion of the visible light that is generated concurrently with ultraviolet radiation from a lamp is directed to a display panel. This is achieved through the use of a fiberoptic filament associated with each lamp. The fiberoptic filament has opposing light input and light output ends. The light input end is placed in optical communication with the ultraviolet lamp to be monitored. The light output end of the filament terminates at a display panel or other location that can observed by operators of the equipment.

Typical fiberglass fiberoptic filaments are fabricated so that they block ultraviolet radiation, while transmitting visible light. Moreover, the fiberoptic filaments do not have to extend in a straight line, but can be bent and contoured as necessary to extend between a position of optical communication with the ultraviolet lamp to be monitored and the lamp display panel or other monitoring position.

In one broad aspect the present invention may be considered to be an improvement in an ultraviolet light irradiation apparatus including an ultraviolet light irradiation lamp concealed from view and an external, observable lamp status display panel. According to the improvement of the invention a fiberoptic lamp status display filament is provided having a first end terminated in optical communication with the ultraviolet lamp and an opposite, second end terminated in the lamp status display panel. Preferably, the end of the ultraviolet light irradiation lamp located proximate to the first end of the display filament is terminated in a ceramic base with a tunnel defined therethrough and which receives the ultraviolet radiation lamp. A lamp connector that supplies electrical operating power to the lamp is also provided. The lamp connector provides a seat for the ceramic base. The first end of the lamp status display filament terminates in the lamp connector and is in optical communication with the lamp through the tunnel defined through the base.

The tunnel is preferably a linear cylindrical passage having a circular, cross section and is defined through the base between its opposing ends. The tunnel conducts visible and ultraviolet light from the ultraviolet irradiation lamp to the first end of the fiberoptic filament. The fiberoptic filament is comprised of a material that passes visible light while blocking, or at least significantly reducing, the transmission of ultraviolet radiation.

In another broad aspect the invention may be considered to be a power status indicator for an ultraviolet irradiation lamp mounted in a base that has a lamp receiving end and a power input end. The base is coupled to a lamp connector that is supplied with electrical power from a power cord connected thereto. A straight, linear light tunnel is defined in the base and extends between the lamp receiving end and the power input end of the base. The tunnel is in optical communication with the ultraviolet lamp. A fiberoptic filament is provided. The fiberoptic filament has a light input end terminating in the lamp connector in optical communication with the light tunnel through the base. The fiberoptic filament also has an opposite light output end that provides a lamp status display to an observer.

The fiberoptic filament suppresses transmission of ultraviolet radiation while facilitating transmission of visible light. The base and the coupling are preferably releaseably joined together.

In still another broad aspect the invention may be considered to be an improvement in an array of ultraviolet light irradiation lamps, each of which is mounted in a separate base and which is provided with electrical operating power through a separate lamp connector dedicated thereto. According to the improvement of the invention a straight light tunnel is provided through each of the bases. Each tunnel is in optical communication with its associated ultraviolet lamp. A separate fiberoptic filament is provided for each lamp. Each filament has a light input end terminating in a single one of the lamp connectors and in optical communication with a single one of the light tunnels. Each fiberoptic filament has an opposite display end terminated in a status display panel.

The display ends of the all of the fiberoptic filaments are arranged in an array in close proximity with each other. Each of the fiberoptic filaments transmits visible light and attenuates ultraviolet radiation.

The invention may be described with greater clarity and particularity by reference to the accompanying drawings.

DESCRIPTION OF THE EMBODIMENT

Figure 1:
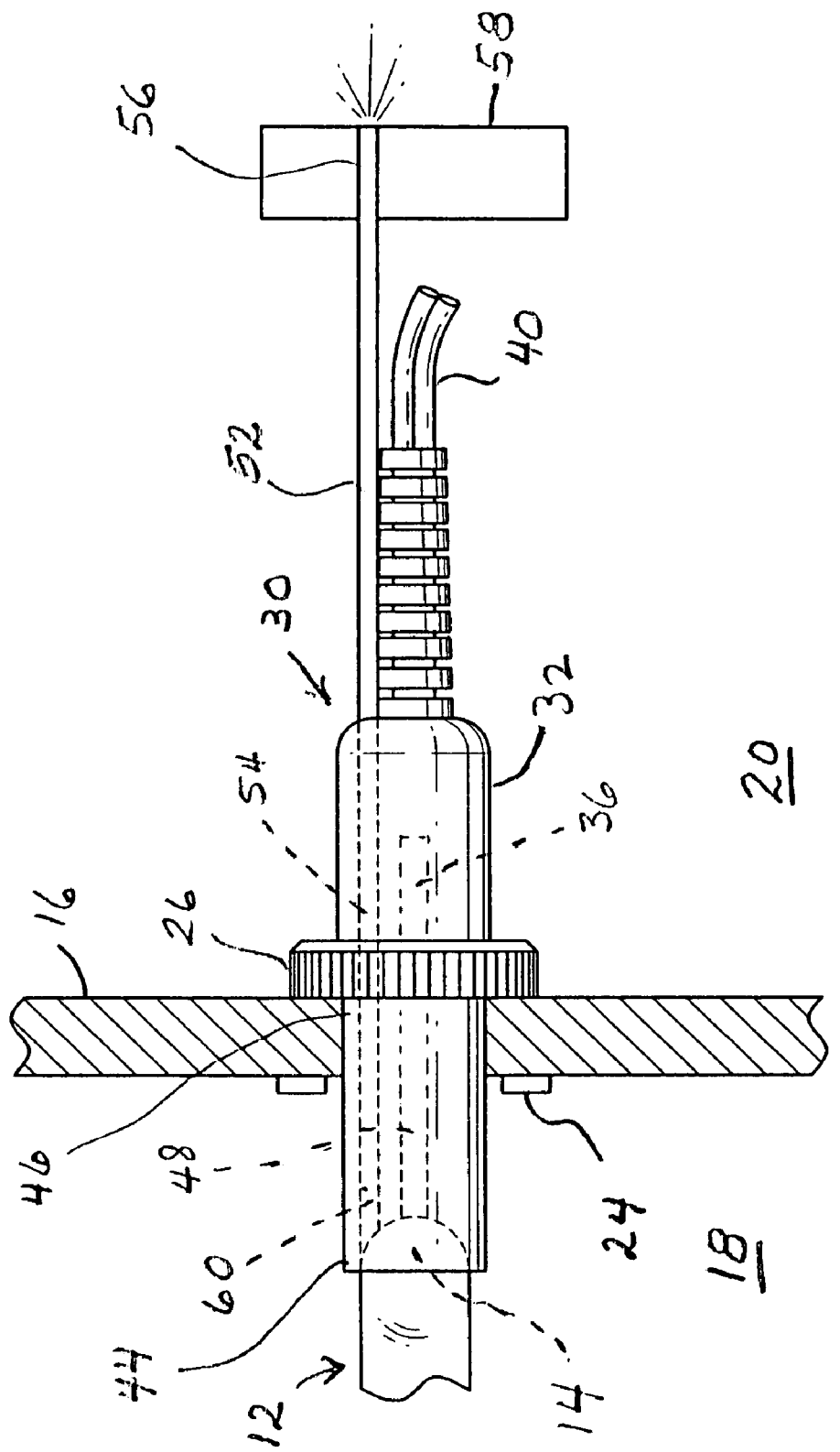
FIG. 1 is a side elevational view illustrating a portion of a single power status indicator for a single ultraviolet lamp constructed according to the invention.
Figure 2:
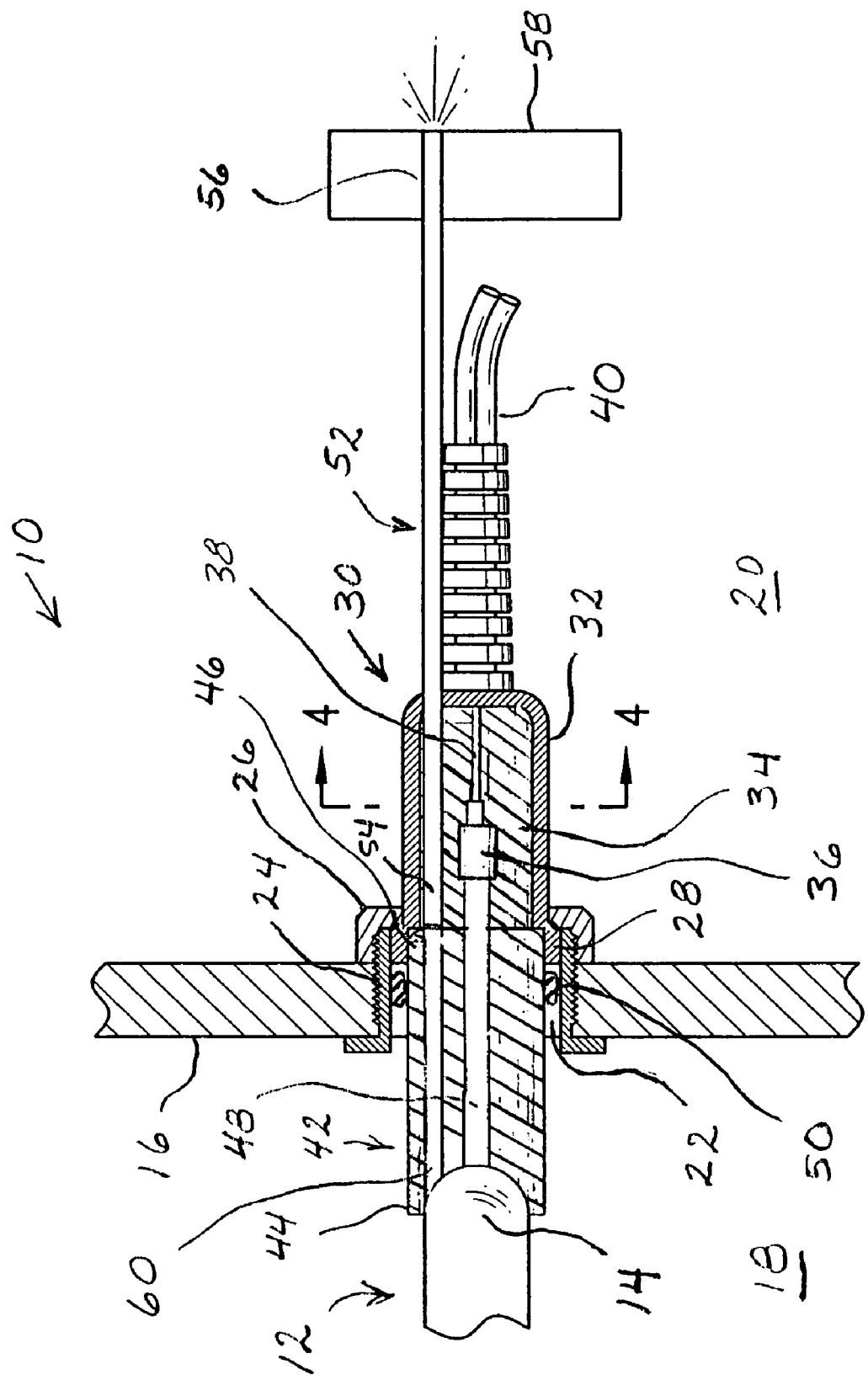
FIG. 2 is a sectional elevational view of the status indicator of FIG. 1.
Figure 3:
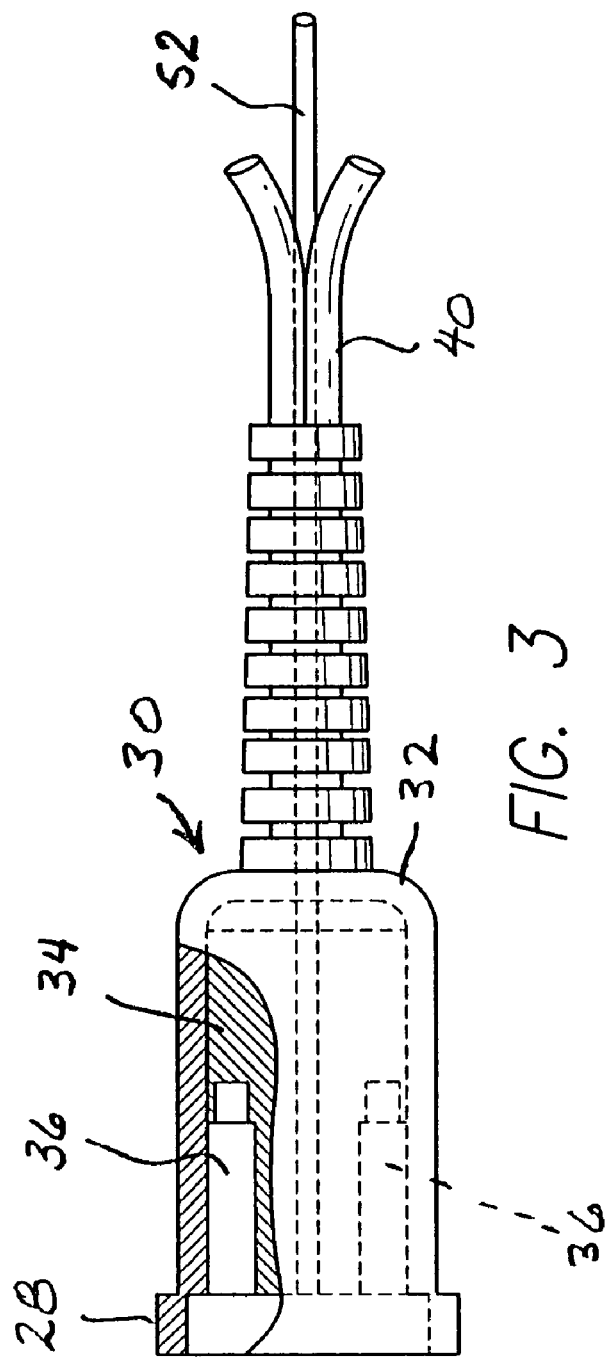
FIG. 3 is an enlarged detail of a single connector, shown partially in section.
Figure 4:
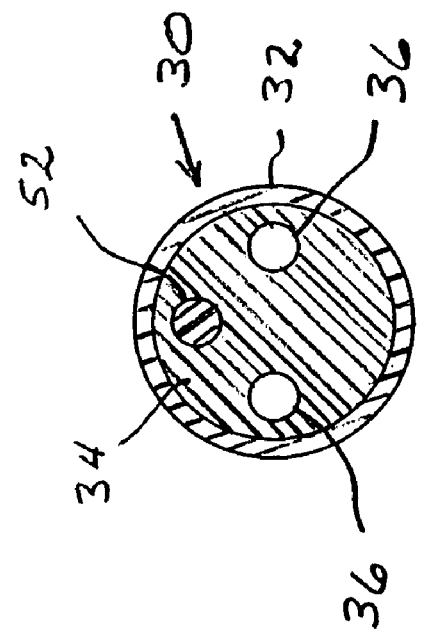
FIG. 4 is a sectional elevation view taken along the lines 4-4 of FIG. 2.

FIGS. 1-4 illustrate an ultraviolet light irradiation apparatus indicated generally at 10. The irradiation apparatus 10 includes an ultraviolet light irradiation lamp 12, the power input end 14 of which is visible in FIG. 2. The ultraviolet irradiation lamp 12 is concealed from view by a metal partition 16. In the area 18 on the side of the partition 16 in which the UV lamp 12 is mounted, materials moving past the UV lamp 12 perpendicular to the plane of drawing FIGS. 1 and 2 is irradiated by the ultraviolet irradiation UV lamp 12. For example, the region 18 may be the interior of a duct through which water flows and is treated to kill bacteria in the water by irradiation using the ultraviolet irradiation UV lamp 12, and typically a plurality of identical lamps of the type illustrated.

System operators and observers are located on the opposite side of the partition 16 in the region indicated at 20. The metal partition 16 is constructed of a material that shields personnel in the region 20 from ultraviolet radiation produced by the UV lamp 12.

At each lamp position there is a mounting aperture 22 in the partition 16 through which each UV lamp 12 is inserted. A hollow nipple 24 is located within each aperture 22. The nipple 24 is engaged by external threads with internal threads in an annular collar 26 which captures a flange 28 of a coupling 30 constructed according to the present invention. The coupling 30 has an outer shell 32 and the flange 28 is formed at the open end of the shell 32. The coupling 30 also includes an electrically insulating internal core 34 into which electrically conductive sockets 36 are embedded. The electrically conductive sockets 36 are connected to wires 38 that are encased within a power cord 40 that leads to an electrical power supply.

The ultraviolet radiation lamp 12 is mounted in a ceramic base 42 which has a lamp receiving end 44 and an opposite, power input end 46. The electrical contacts for the lamp 12 are connected to a pair of longitudinally extending plug pins 48 at the lamp receiving end 44 of the ceramic base 42. The electrical plug pins 48 extend longitudinally from the lamp receiving end 44 of the ceramic base 42 and project beyond the power input end 46 of the ceramic base 42. The projecting portions of the plug pins 48 that protrude out of the power input end 46 of the ceramic base 42 have a diameter and are spaced apart an appropriate distance to both fit snugly into the electrical sockets 36 embedded within the lamp connector 30. The power input end 46 of the ceramic base 42 has an outer cross-sectional area that fits snugly into the embrace of the flange 28, so that the connector 30 and ceramic base 42 are snugly, but releaseably coupled together. A rubber gasket 50 is interposed between the ceramic base 42 and the interior surface of the nipple 24 to create a fluid-tight seal to prevent any fluid from escaping the area 18 through the aperture 22.

The foregoing features of the power status indicator 10 thus far described are conventional and different variations exist within the ultraviolet irradiation industry for connecting ultraviolet irradiation lamps to an electrical power supply. The improvement of the invention resides in the provision of a narrow, cylindrical, fiberoptic filament 52 that has a light input end 54 that is embedded within and extends the length of the lamp connector 30. The opposite output end 56 of the fiberoptic filament 52 provides a visible lamp status display to an observer. Typically the light output end 56 of the fiberoptic filament 52 terminates in a display panel, indicated at 58 in FIGS. 1 and 2.

The ceramic base 42 is provided with a longitudinally extending, cylindrical tunnel 60 defined throughout its length from the lamp receiving end 44 to the opposite power input end 46. The light tunnel 60 is simply an open passage of circular cross section and straight, linear, cylindrical shape that extends the entire length of the ceramic base 42. When the electrical power plug pins 48 are inserted into the sockets 36, the light tunnel 60 is coaxially aligned with the termination of the light input end 54 of the fiberoptic filament 52. As a consequence, both visible and ultraviolet radiation easily pass through the light tunnel 60.

When visible and ultraviolet light reach the light input end 54 of the fiberoptic filament 52, the fiberoptic filament 52 serves as a filter that transmits visible light while largely blocking ultraviolet radiation. Visible light that enters the light input end 54 of the fiberoptic filament 52 passes longitudinally along the length of the fiberoptic filament 52 and is observable to a system operator or inspector at the termination of the display end 56 of the fiberoptic filament in the display panel 58.

While the fiberoptic filament 52 has been illustrated as having a straight, linear shape in FIGS. 1 and 2, it is to be understood that the fiberoptic filament 52 can be bent through significant angles and follow a circuitous route before reaching the display panel 58. Irrespective of the manner in which the fiberoptic filament 52 is routed from the connector 30 to the display panel 58, visible light will travel unimpeded along the entire length of the fiberoptic filament 52, just as water travels through an open pipe.

Once the ceramic bases 42 of the ultraviolet lamps 12 have been inserted into their respective openings 22, power is provided to the lamps 12 by connecting to each lamp 12 a dedicated releaseable coupling 30. That is, the releaseable coupling 30 is inserted so that the annular flange 28 surrounds and engages the power input ends of the ceramic bases 42. As the couplings 30 are pushed onto the power input ends 46 of the ceramic bases 42 the electrically conductive plug prongs 48 extending from the power input ends 46 of the ceramic bases 42 are received by the sockets 36 to establish an electrical connection to the lamps 12 from the power supply that supplies electricity through the power cord 40.

The connectors 30 are releaseably coupled to the bases 42 of the lamps 12 by means of the internally threaded collars 26 which are screwed onto the externally threaded nipples 24. The lamp connector 30 thereby supplies electrical operating power to its associated ultraviolet irradiation lamp 12. Concurrently, the light input end 54 of the fiberoptic filament 52 is aligned with the light tunnel 60 so that once power is turned on to the ultraviolet irradiation tube 12, visible light will be transmitted from the light input end 54 of the fiberoptic filament 52, along the entire length of the fiberoptic filament 52 to the light output end 56 thereof in the display panel 58 or 62.

The ultraviolet light irradiation lamp 12 is concealed from view from an observer of the external lamp status display panel 58 or 62. The first end 54 of the lamp status display filament 52 is terminated within the coupling 30 in optical communication with the ultraviolet lamp 12. The opposite, second end 56 of the lamp status display filament 52 is terminated in the lamp status display panel 58 or 62. The ceramic base 42 receives the ultraviolet radiation lamp 12 and in turn is nested into the lamp connector 30. The lamp connector 30 supplies electrical operating power to the lamp 12. The first end 54 of the lamp status display filament 52 terminates in the lamp connector 30 so that it is in optical communication with the lamp 12 through the tunnel 60.

Figure 5:
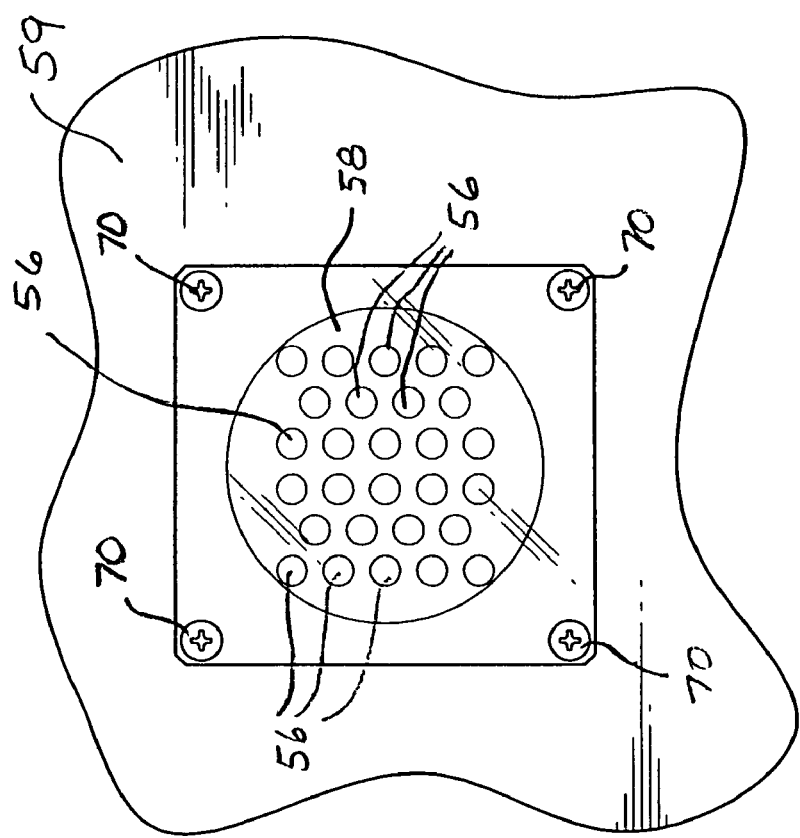
FIG. 5 illustrates one embodiment of a display panel according to the invention.

Consequently, and as indicated in FIG. 5, the light output ends 56 of a number of different fiberoptic filaments 52 can be brought together in an appropriate display panel. The display panel may have a circular shape, such as the display panel 58 indicated in FIG. 5.

The panel 58 is a typical arrangement for an array of ultraviolet irradiation lamps 12 that are located within a closed vessel 59. Typically there are between six and fifty-six ultraviolet lamps 12 mounted within the vessel 59, each of which is provided with a separate fiberoptic filament 52 that is dedicated to each ultraviolet lamp 12. The fiberoptic filaments are routed so that their light output ends 56 terminate in close proximity to each other, preferably in a manner indicative of their positions within the vessel 59.

Figure 6:
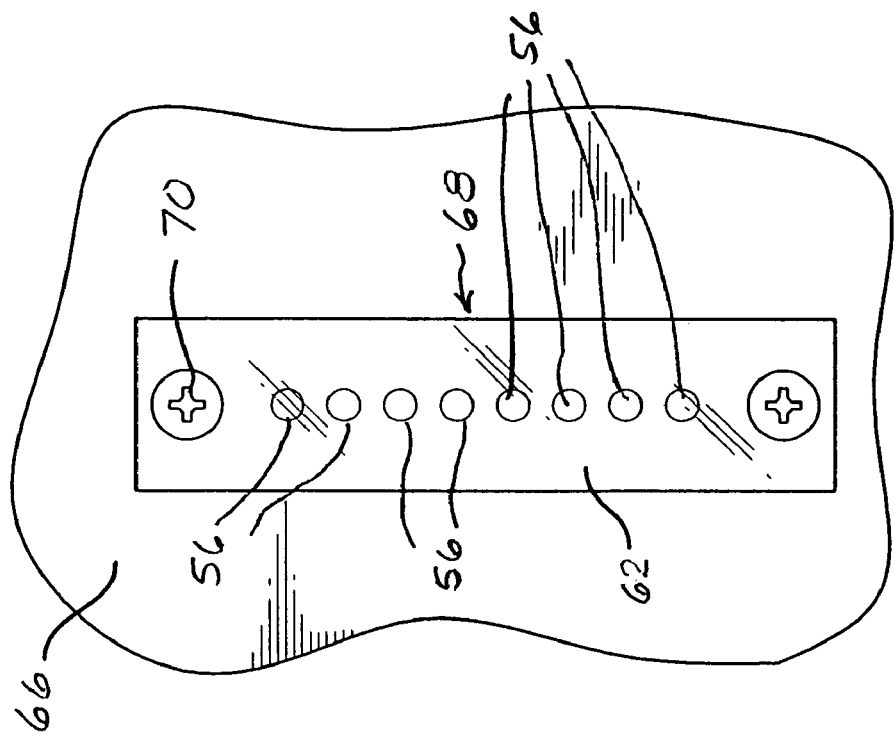
FIG. 6 illustrates an alternative embodiment of a display panel according to the invention.

Alternatively, the light output ends 56 of the fiberoptic filaments 52 may terminate in a display panel 62 in which the light output ends 56 of a plurality of fiberoptic filaments 52 terminate in a linear array, as illustrated in FIG. 6. In a typical water irradiation system there are often eight individual fiberoptic filaments 52, each dedicated to a single ultraviolet irradiation lamp 12, and terminating together in a linear array in a display panel 62. The display panels 62 may contain the light output ends 56 of a group of eight or any other number of fiberoptic filaments 52, as illustrated in FIG. 6. Where a multiplicity of ultraviolet irradiation tubes 12 are employed, a number of the display panels 62 may be arranged in separate power distribution and control modules 66 in a side-by-side array, as illustrated in FIG. 7.

Figure 7:
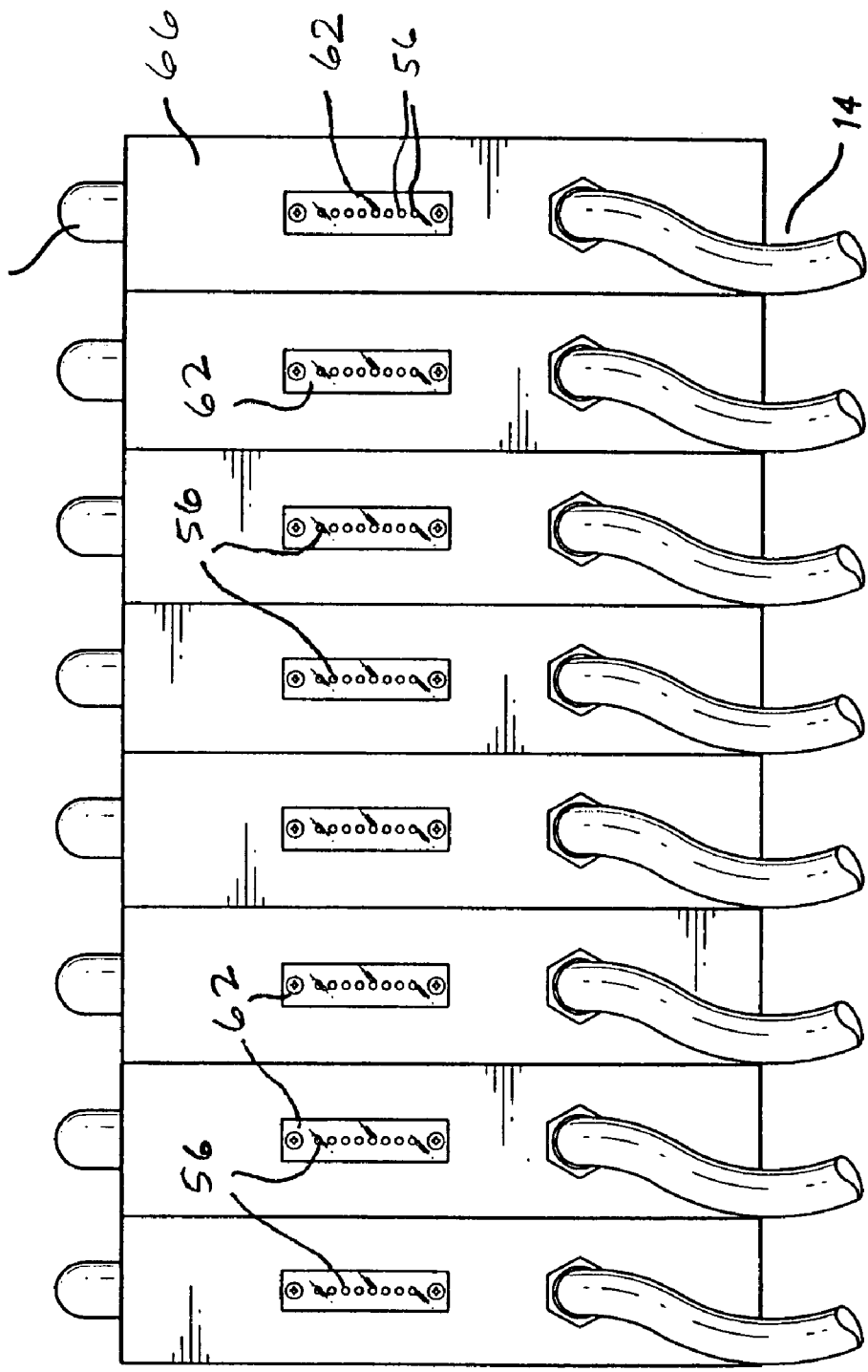
FIG. 7 illustrates and array of display panels of the type illustrated in FIG. 6 as coupled to a typical ultraviolet irradiation system.

The arrangement illustrated in FIG. 7 is typical of an installation of the type employed in irradiating water flowing through a laterally enclosed channel. The display panels 62 are typically the transverse, exposed ends of slide-out shelves 68 that are secured by screws 70 that releaseably hold the shelves 68 in place in a module 66. In a typical module 66 circuit protection is provided by a fuse in a main circuit breaker (not shown) on each shelf. These features are conventional.

When a single ultraviolet irradiation lamp 12 or, more typically, a plurality of ultraviolet irradiation lamps 12 of the type illustrated in FIG. 2 are in operation, the lamps 12 irradiate fluid or other materials passing through or constrained within a laterally shielded irradiation chamber 18. When the ultraviolet irradiation lamps 12 are providing ultraviolet radiation, they also provide a certain amount of visible light as well. Some of this visible light travels through the light tunnel 60 in the ceramic base 42. This visible light enters the first, light input end 54 of the fiberoptic filament 52 dedicated to that ultraviolet irradiation lamp 12. The fiberoptic filament 52 facilitates and passes visible light that it receives from the light tunnel 60 while suppressing or blocking ultraviolet radiation. As a consequence, little, if any, ultraviolet radiation emanates from the light output end 56 of the fiberoptic filaments 52.

It is evident that if all of the ultraviolet irradiation lamps 12 are illuminated and providing ultraviolet radiation, there will be a light output from all of the light output ends 56 of all of the fiberoptic filaments 52 terminating in the display panels 58 or 62. On the other hand, should any ultraviolet irradiation lamp 12 fail to provide an output of ultraviolet radiation, either due to a burnout of the lamp 12 itself or a failure of a power connection, perhaps by a blown fuse, to the coupling 30, ultraviolet radiation will no longer be emitted from the malfunctioning lamp 12.

As a consequence, visible light from the malfunctioning lamp 12 is also extinguished. As a result, the radiation output through the light tunnel 60 associated with the malfunctioning lamp 12 ceases, as does the transmission of visible light through fiberoptic filament 52. The light output end 56 of the fiberoptic filament 52 for the malfunctioning lamp 12 then stops emitting light. The absence of light emission at the monitoring panel 58 or 62 is thus readily observable. The operator or inspector thereby is immediately informed of the malfunction of the lamp 12, as well as the specific location of the lamp 12 that has failed. Appropriate steps can then be taken to remedy the malfunction.

Undoubtedly, numerous variations and modifications of the invention will become readily apparent to those familiar with ultraviolet light irradiation systems. Accordingly, the scope of the invention should not be construed as limited to the specific embodiments described, but rather is defined in the claims appended hereto.

I claim:

1. In an ultraviolet light irradiation apparatus including an ultraviolet light irradiation lamp concealed from view and an external, observable lamp status display panel, the improvement comprising a fiberoptic lamp status display filament having a first end terminated in optical communication with said ultraviolet lamp and an opposite, second end terminated in said lamp status display panel.

2. An ultraviolet light irradiation apparatus according to claim 1 further comprising a ceramic base with a tunnel therethrough and which receives said ultraviolet radiation lamp, a lamp connector that seats said ceramic base and supplies electrical operating power to said lamp, and said first end of said lamp status display filament terminates in said lamp connector so that said first end of said filament is in optical communication with said lamp through said tunnel.

3. An ultraviolet light irradiation apparatus according to claim 1 wherein said ceramic base has a lamp receiving end and an opposing power input end, and further characterized in that a linearly aligned tunnel is defined through said base between said opposing ends thereof, and said tunnel conducts visible and ultraviolet light from said ultraviolet irradiation lamp to said first end of said fiberoptic filament.

4. An ultraviolet light irradiation apparatus according to claim 1 wherein said fiberoptic filament is fabricated of a material that passes visible light while blocking ultraviolet radiation.

5. A power status indicator for an ultraviolet irradiation lamp mounted in a base that has a lamp receiving end and a power input end and which is coupled to a lamp connector supplied with electrical power from a power cord connected thereto comprising a straight linear light tunnel defined in said base and extending between said lamp receiving end and said power input end thereof and in optical communication with said ultraviolet lamp, and a fiberoptic filament having a light input end terminating in said lamp connector in optical communication with said light tunnel through said base and an opposite light output end that provides a lamp status display to an observer.

6. A power status indicator according to claim 5 wherein said fiberoptic filament suppresses transmission of ultraviolet radiation while facilitating transmission of visible light.

7. A power status indicator according to claim 5 wherein said base and said coupling are releaseably joined together.

8. In an array of ultraviolet light irradiation lamps each of which is mounted in a separate base and which is provided with electrical operating power through a separate lamp connector dedicated thereto, the improvement comprising a straight light tunnel through each of said bases in optical communication with said ultraviolet lamp and a separate fiberoptic filament, each having a light input end terminated in a single one of said lamp connectors and in optical communication with a single one of said light tunnels and an opposite display end terminated in a status display panel.

9. An array of ultraviolet light irradiation lamps according to claim 8 wherein said display ends of all of said fiberoptic filaments are physically terminated in close proximity to each other.

10. An array of ultraviolet light irradiation lamps according to claim 8 wherein each of said fiberoptic filaments transmits visible light and attenuates ultraviolet radiation.

\* \* \* \* \*